United States Patent
Watanabe et al.

(10) Patent No.: US 6,621,052 B2
(45) Date of Patent: Sep. 16, 2003

(54) SILICON NITRIDE-TUNGSTEN CARBIDE COMPOSITE SINTERED MATERIAL, PROCESS FOR PREPARING THE SAME AND GLOW PLUG

(75) Inventors: Hiroki Watanabe, Gifu (JP); Katsura Matsubara, Aichi (JP); Masaya Ito, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/006,132

(22) Filed: Dec. 10, 2001

(65) Prior Publication Data

US 2002/0113052 A1 Aug. 22, 2002

(30) Foreign Application Priority Data

Dec. 8, 2000 (JP) .......................................... 2000-374549

(51) Int. Cl.⁷ .................................................. F23Q 7/22
(52) U.S. Cl. ........................ 219/270; 51/307; 501/153
(58) Field of Search ................................. 219/267, 553, 219/270; 501/153, 87; 423/344; 51/307, 308; 264/29.5; 428/65.6, 403

(56) References Cited

U.S. PATENT DOCUMENTS

| | | | | |
|---|---|---|---|---|
| 4,117,057 A | * | 9/1978 | Yajima et al. | 264/29.5 |
| 4,617,055 A | * | 10/1986 | Miura et al. | 428/403 |
| 4,652,276 A | * | 3/1987 | Burden | 51/308 |
| 4,738,885 A | * | 4/1988 | Matsumoto | 428/65.6 |
| 4,804,823 A | * | 2/1989 | Okuda et al. | 219/553 |
| 5,178,647 A | * | 1/1993 | Komatsu et al. | 51/307 |
| 5,364,608 A | * | 11/1994 | Edler | 423/344 |
| 5,656,561 A | * | 8/1997 | Rogers et al. | 501/87 |
| 5,750,958 A | * | 5/1998 | Okuda et al. | 219/267 |
| 6,069,105 A | * | 5/2000 | Yamamoto et al. | 501/153 |
| 6,328,913 B1 | * | 12/2001 | Shaffer et al. | 252/500 |

FOREIGN PATENT DOCUMENTS

| | | |
|---|---|---|
| JP | 8-45648 | 2/1996 |
| JP | 8-64346 | 3/1996 |
| JP | 10-50460 | 2/1998 |
| JP | 11-214124 | 8/1999 |

* cited by examiner

*Primary Examiner*—Teresa Walberg
*Assistant Examiner*—L Fastovsky
(74) *Attorney, Agent, or Firm*—Sughrue Mion, PLLC

(57) ABSTRACT

A silicon nitride—tungsten carbide composite sintered and process for preparing the same which contains silicon nitride and tungsten carbide, and is characterized in that the total in amounts of an entirety of rare earth elements as reduced to certain corresponding oxides thereof, the elements being contained in the sintered material, and excess oxygen as reduced to silicon dioxide is 6–20 mass %; the ratio, on a mol basis, of (the amounts of rare earth elements as reduced to the certain corresponding oxides thereof)/(the amounts of the rare earth elements as reduced to the corresponding oxides thereof+the amount of excess oxygen as reduced to silicon dioxide) is 0.3–0.7; a crystalline phase is present in an intergrain region of the sintered material; and an effective firing temperature range within which a flexural strength of at least 800 MPa is obtained encompasses at least 100 degrees. Also disclosed is a glow plug having a ceramic heater comprising the silicon nitride—tungsten carbide composite sintered material.

12 Claims, 1 Drawing Sheet

SILICON NITRIDE-TUNGSTEN CARBIDE COMPOSITE SINTERED MATERIAL, PROCESS FOR PREPARING THE SAME AND GLOW PLUG

BACKGROUND OF THE INVENTION

1. Field of the Invention

The present invention relates to a silicon nitride—tungsten carbide composite sintered material and process for preparing the same, and more particularly to a silicon nitride—tungsten carbide composite sintered material which is endowed with high strength, can attain reduced electrical resistance, exhibits reliable characteristics under wide ranges of firing conditions, and which avoids generation of tungsten silicide, which is a brittle substance. The present invention also relates to a glow plug employing the silicon nitride—tungsten carbide composite sintered material as a ceramic heating resistor.

2. Description of the Related Art

Conventionally, silicon nitride—tungsten carbide composite sintered material is used as a wear-resistant member such as a bearing ball or as a material for a heater of a glow plug, since the sintered material exhibits excellent wear resistance, and electrical resistance of the sintered material can be controlled easily. A typical approach to attain such intended characteristics of the sintered material is to regulate the amount of tungsten carbide to be incorporated into the sintered material. In order to meet the recent demand for enhancement of wear resistance and reduction of electrical resistance for attaining power savings, in some cases, the ratio of tungsten incorporated into the silicon nitride—tungsten carbide composite sintered material must be increased.

However, when the incorporation amount of tungsten carbide is increased in order to attain enhancement of wear resistance and reduction of electrical resistance with an aim toward power savings, sinterability of raw materials may be lowered significantly. As a result, an effective firing temperature range within which reliable characteristics are obtained is narrowed, and due to the non-uniformity of temperature within the firing furnace or changes in furnace temperature over the course of time caused by impairment of consumable parts of the furnace, reliable characteristics cannot be obtained. Meanwhile, conversion of tungsten carbide in sintered material into tungsten silicide, which is a brittle substance, through reaction between the tungsten carbide and silicon nitride causes deterioration of mechanical characteristics and electrical characteristics of the sintered material. This conversion tends to occur particularly in the vicinity of a firing jig formed from graphite. Thus, hitherto, there remains a need for a silicon nitride—tungsten carbide composite sintered material which exhibits excellent wear resistance, attains reduction of electrical resistance, realizes enhancement of sinterability, provides a wide effective firing temperature range within which reliable characteristics are obtained, and is endowed with high strength.

SUMMARY OF THE INVENTION

In view of the foregoing, an object of the present invention is to provide a silicon nitride—tungsten carbide composite sintered material which is endowed with high strength, can attain reduction of electrical resistance, exhibits reliable characteristics under wide ranges of firing conditions, and prevents generation of tungsten silicide, which is a brittle substance.

The present inventors have studied the relationship between components of a silicon nitride—tungsten carbide composite sintered material and characteristics of the sintered material, and have found that, when the amounts of rare earth elements as reduced to certain corresponding oxides thereof, the elements serving as sintering aid components, are regulated, and when the amount of excess oxygen as reduced to silicon dioxide is regulated, the sintered material exhibits high strength, electrical resistance can be reduced, an effective firing temperature range within which reliable characteristics are obtained can be widened, and conversion of tungsten carbide into tungsten silicide can be prevented. The present invention has been accomplished on the basis of this finding.

The present invention provides a silicon nitride—tungsten carbide composite sintered material comprising silicon nitride and tungsten carbide, characterized in that the total in amounts of an entirety of rare earth elements as reduced to certain corresponding oxides thereof, the elements being contained in the sintered material, and excess oxygen as reduced to silicon dioxide is 6–20 mass %; and the ratio, on a mol basis, of (the amounts of rare earth elements as reduced to the certain corresponding oxides thereof)/(the amounts of the rare earth elements as reduced to the corresponding oxides thereof+the amount of excess oxygen as reduced to silicon dioxide) is 0.3–0.7.

The present invention also provides a process for preparing the above-described silicon nitride—tungsten carbide composite sintered material, which comprises sintering a mixture of silicon nitride powder, an oxide of a rare earth element and silicon dioxide powder, the composite sintered material having a flexural strength of at least 800 MPa obtainable by sintering at an effective firing temperature which encompasses a range of at least 100° C.

The present invention also provides a glow plug having a ceramic heater comprising the above-described silicon nitride—tungsten carbide composite sintered material.

In the silicon nitride—tungsten carbide composite sintered material of the present invention, a crystalline phase is present in an intergrain region of the sintered material. In the silicon nitride—tungsten carbide composite sintered material of the present invention, an effective firing temperature range within which a flexural strength of at least 800 MPa is obtained encompasses at least 100 degrees centigrade.

In the silicon nitride—tungsten carbide composite sintered material of the present invention, the aforementioned "rare earth element" is one or more elements selected from among, for example, Y, Sc, La, Ce, Pr, Nd, Gd, Tb, Dy, Er and Yb. The aforementioned "the amounts of rare earth elements as reduced to certain corresponding oxides thereof" refers to the amounts of the rare earth elements as reduced to their oxides (i.e., $RE_2O_3$, RE: rare earth element), the elements being contained in the silicon nitride—tungsten carbide composite sintered material. In the silicon nitride—tungsten carbide composite sintered material of the present invention, the aforementioned "excess oxygen" refers to oxygen contained in silicon nitride and oxygen in silicon dioxide that is added from the outside. The aforementioned "the amount of excess oxygen as reduced to silicon dioxide" refers to the amount of the above-defined "excess oxygen" as reduced to silicon dioxide. The aforementioned "the amounts of rare earth elements as reduced to certain corresponding oxides thereof" is not particularly limited, so long as the total in amounts of an entirety of rare earth elements as reduced to certain corresponding oxides thereof and excess oxygen as reduced to silicon dioxide, and the ratio, on a mol basis, between the amounts of the rare earth elements and the amount of the excess oxygen satisfy the below-described conditions. The phrase "as reduced to" used herein implies "if converted to" or "if present in the form of", and does not necessarily imply any chemical reduction reaction.

In the silicon nitride—tungsten carbide composite sintered material of the present invention, the total of the amount of the rare earth element as reduced to the oxide thereof and the amount of the excess oxygen as reduced to silicon dioxide is usually 6–20 mass %, preferably 7–15 mass %, more preferably 7–11 mass %. When the total amount is less than 6 mass %, the amount of the sintering aid is insufficient for sintering of tungsten carbide and silicon nitride. Therefore, sinterability is lowered, and the fine structure of the sintered material tends to vary considerably with firing temperature. As a result, an effective firing temperature range within which reliable characteristics are obtained is narrowed, silicon nitride easily decomposes, and the resultant silicon component reacts with tungsten carbide to thereby generate a brittle substance; i.e., tungsten silicide, which is not preferable. In contrast, when the total amount exceeds 20 mass %, the electrical resistance of the sintered material increases, and the thermal shock resistance of the sintered material lowers, which is not preferable.

In the silicon nitride—tungsten carbide composite sintered material of the present invention, the ratio, on a mol basis, of (the amounts of rare earth elements as reduced to certain corresponding oxides thereof)/(the amounts of the rare earth elements as reduced to the corresponding oxides thereof+the amount of excess oxygen as reduced to silicon dioxide) is usually 0.3–0.7, preferably 0.3–0.5, more preferably 0.35–0.45. When the ratio is less than 0.3, the amount of the rare earth element is excessively small; i.e., the amount of the sintering aid is insufficient for sintering of tungsten carbide and silicon nitride, resulting in lowering of sinterability, which is not preferable. In contrast, when the ratio exceeds 0.7, the amounts of the rare earth elements are excessively large, and the total amount of the rare earth elements is not well balanced with the amount of the excess oxygen, resulting in insufficient sintering, which is not preferable.

Intergrain regions of the silicon nitride—tungsten carbide composite sintered material of the present invention may contain a crystalline phase in addition to an amorphous phase of, for example, rare earth elements, silicon, oxygen, or nitrogen. When a crystalline phase is present in the intergrain regions, softening of grain boundary glass at high temperatures is prevented, and mechanical characteristics of the sintered material at high temperature can be enhanced, which is preferable. Examples of the crystalline phase include $RE_2Si_2O_7$ and $RE_2SiO_5$ (RE: rare earth element). The crystalline phase may contain one or more species of these.

Regarding the silicon nitride—tungsten carbide composite sintered material of the present invention, since sinterability of raw materials can be enhanced, an effective firing temperature range within which reliable characteristics are obtained can be widened, as compared with the case of conventional silicon nitride—tungsten carbide composite sintered material. Specifically, an effective firing temperature range within which a flexural strength of 800 MPa or more is obtained encompasses at least 100 degrees, preferably at least 140 degrees, more preferably at least 180 degrees. When raw materials of the sintered material have such an effective firing temperature range, regardless of non-uniformity of temperature within a firing furnace or time-course change in furnace temperature caused by impairment of consumable parts of the furnace, reliable characteristics of the sintered material can be obtained, which is preferable.

No particular limitation is imposed on the total amount of silicon nitride and tungsten carbide incorporated into the silicon nitride—tungsten carbide composite sintered material of the present invention. In the sintered material, the total amount is usually 80–95 mass %, preferably 85–95 mass %, more preferably 88–94 mass %. When the total amount falls within the above range, sinterability is not lowered, and the sintered material has low electrical resistance, which is preferable.

No particular limitation is imposed on the sintering method and sintering conditions for producing the silicon nitride—tungsten carbide composite sintered material of the present invention, so long as the sintered material can be produced. A sintering aid is not necessarily used, and sintering may be carried out at ambient pressure or at high pressure. The sintering temperature is usually 1,700–2,000° C. In order to prevent decomposition of silicon nitride, sintering is usually carried out in a nonoxidizing gas atmosphere containing nitrogen.

DESCRIPTION OF THE PREFERRED EMBODIMENTS

Figure 1:
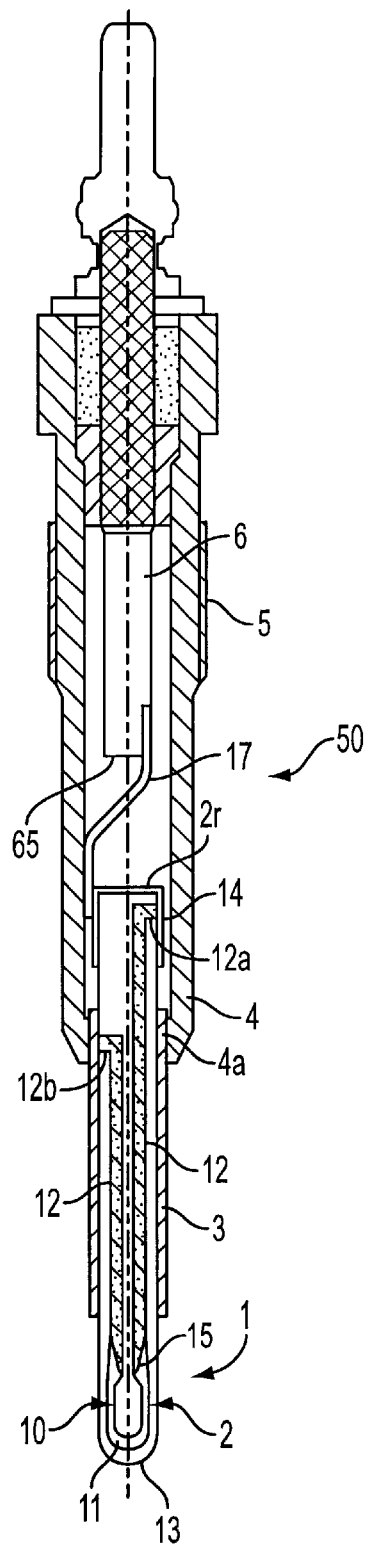
FIG. 1 is a cross-section of a glow plug incorporating the silicon nitride—tungsten carbide composite sintered material of the invention as a ceramic heating resistor 10.

The present invention will next be described in detail by way of Examples and Comparative Examples. However, the present invention should not be construed as being limited thereto.

Silicon nitride powder (average particle size: 0.5–1.0 μm), tungsten carbide powder (average particle size: 0.5–1.0 μm), an oxide of a rare earth element ($Y_2O_3$, $Er_2O_3$, or $Yb_2O_3$ [average particle size: 1.0–3.0 μm]), and silicon dioxide powder (average particle size: 0.6 μm), serving as raw materials, were mixed so as to attain a formulation shown in Table 1, to thereby prepare a raw material powder mixture. Subsequently, the raw material powder mixture was wet-mixed in $H_2O$ for 40 hours by use of grinding balls formed from silicon nitride, and then dried in a hot water bath. Thereafter, the resultant powder mixture was fired for one hour by hot pressing in a nitrogen atmosphere at 1,800° C. and 25 MPa, to thereby yield a sintered material having dimensions of 45 mm×45 mm×5 mm (sintered materials Nos. 1 through 12).

TABLE 1

| Sample No. | $Si_3N_4$ (wt %) | WC (wt %) | $RE_2O_3$ (wt %) | $SiO_2$ (wt %) | $RE_2O_3$ + excess $SiO_2$ reduced amount (wt %) | $RE_2O_3/(RE_2O_3 + SiO_2)$ |
|---|---|---|---|---|---|---|
| Ex. | | | | | | |
| 1 | 29.7 | 59.0 | $Y_2O_3$ 5.0 | 0.6 | 6.2 | 0.31 |
| 2 | 32.7 | 60.8 | $Y_2O_3$ 5.6 | 0.9 | 7.2 | 0.35 |
| 3 | 31.3 | 58.0 | $Yb_2O_3$ 8.9 | 1.8 | 11.4 | 0.36 |
| 4 | 31.5 | 58.6 | $Y_2O_3$ 9.0 | 0.9 | 10.6 | 0.46 |
| 5 | 24.8 | 58.0 | $Er_2O_3$ 16.5 | 0.8 | 18.0 | 0.63 |
| 6 | 32.8 | 49.2 | $Yb_2O_3$ 16.4 | 1.6 | 18.5 | 0.45 |
| 7 | 25.8 | 55.4 | $Y_2O_3$ 18.1 | 0.7 | 19.3 | 0.70 |
| 8 | 42.2 | 38.9 | $Yb_2O_3$ 16.9 | 2.0 | 19.9 | 0.48 |

TABLE 1-continued

| Sample No. | Si₃N₄ (wt %) | WC (wt %) | RE₂O₃ (wt %) | SiO₂ (wt %) | RE₂O₃ + excess SiO₂ reduced amount (wt %) | RE₂O₃/(RE₂O₃ + SiO₂) |
|---|---|---|---|---|---|---|
| Comp. Ex. | | | | | | |
| 9 | 28.4 | 66.6 | Yb₂O₃ 4.3 | 0.7 | 5.8 | 0.32 |
| 10 | 27.6 | 52.7 | Y₂O₃ 18.6 | 1.1 | 20.5 | 0.68 |
| 11 | 31.8 | 61.9 | Yb₂O₃ 5.5 | 0.8 | 8.2 | 0.27 |
| 12 | 26.0 | 54.8 | Yb₂O₃ 18.3 | 0.9 | 19.8 | 0.74 |

Each of the sintered materials Nos. 1 through 12 was subjected to measurement of relative density, flexural strength, specific resistance, fracture toughness ($K_{IC}$), and effective firing temperature range within which a flexural strength of 800 MPa or more is obtained, and generation of tungsten silicide was investigated. The results are shown in Table 2. In order to obtain the relative density (%) of the sintered material, the density of the sintered material was measured by means of Archimedes' principle, and the ratio of the resultant density to the theoretical density calculated by means of the law of mixing was calculated. The flexural strength (MPa) was measured by means of a method according to JIS R1601 (1981). In order to obtain the specific resistance ($\mu\Omega$·cm), each of the sintered materials Nos. 1 through 12 was formed into a test piece having dimensions of 3 mm×4 mm×15 mm, and the resistance of the test piece was measured by applying measurement terminals of a milli-ohm meter to both ends of the test piece at room temperature. The specific resistance was calculated on the basis of the thus-measured resistance by means of the below-described formula. The fracture toughness (MPa/m$^{1/2}$) was obtained according to JIS R1607 (1990). The effective firing temperature range within which a flexural strength of 800 MPa or more is obtained was measured by use of a radiation thermometer. Generation of tungsten silicide was investigated by means of X-ray diffraction. Sintered materials Nos. 1 through 8 (i.e., Examples) shown in Tables 1 and 2 fall within the scope of the present invention, and sintered materials Nos. 9 through 12 (i.e., Comparative Examples) shown in Tables 1 and 2 fall outside the scope of the present invention.

Specific resistance=(resistance [$\mu\Omega$]×cross-sectional area of sample [cm²])/(sample length [cm])

Effects Exerted by Working Examples:

As is apparent from Table 2, in the sintered materials Nos. 1 through 8 in which the total in amounts of an entirety of rare earth elements as reduced to certain corresponding oxides thereof and excess oxygen as reduced to silicon dioxide is 6–20 mass %, and the ratio, on a mol basis, of (the amounts of rare earth elements as reduced to the certain corresponding oxides thereof)/(the amounts of the rare earth elements as reduced to the corresponding oxides thereof+the amount of the excess oxygen as reduced to silicon dioxide) is 0.3–0.7, by virtue of excellent sinterability, the relative density is 99–100%, flexural strength is 930–1,100 MPa, and fracture toughness is 4.7–5.8 MPa/m$^{1/2}$, which values are higher than in the cases of the sintered materials Nos. 9 through 12 (i.e., Comparative Examples); and generation of tungsten silicide, which is a brittle substance, is not observed. Therefore, the sintered materials Nos. 1 through 8 exhibit excellent strength. Since the specific resistance is as low as 2,700–8,000 $\mu\Omega$·cm, when the sintered materials Nos. 1 through 8 are used as a heater of, for example, a glow plug, power consumption can be reduced. In addition, since the effective firing temperature range is as wide as 130–180 degrees, reliable characteristics are obtained regardless of non-uniformity of temperature within a firing furnace or time-course change in furnace temperature caused by impairment of consumable parts of the furnace.

As is also apparent from Table 2, in the sintered materials Nos. 9 and 10 in which the total in amounts of an entirety of rare earth elements as reduced to certain corresponding oxides thereof and excess oxygen as reduced to silicon dioxide falls outside the range of the present invention, and in the sintered materials Nos. 11 and 12 in which the ratio, on a mol basis, of (the amounts of rare earth elements as reduced to the certain corresponding oxides thereof)/(the

TABLE 2

| Sample No. | Relative density (%) | Flexural strength (MPa) | Specific resistance ($\mu\Omega$ · cm) | Fracture toughness (MPa/m½) | Effective firing temperature range (° C.) | Generation of tungsten silicide |
|---|---|---|---|---|---|---|
| Ex. | | | | | | |
| 1 | 99 | 930 | 3200 | 4.8 | 140 | No |
| 2 | 100 | 950 | 3700 | 4.9 | 160 | No |
| 3 | 100 | 970 | 6700 | 5.1 | 160 | No |
| 4 | 100 | 950 | 4900 | 5.5 | 160 | No |
| 5 | 100 | 1100 | 2700 | 5.8 | 180 | No |
| 6 | 100 | 930 | 8000 | 4.9 | 160 | No |
| 7 | 100 | 980 | 4300 | 4.7 | 140 | No |
| 8 | 99 | 1050 | 9800 | 5.2 | 130 | No |
| Comp. Ex. | | | | | | |
| 9 | 93 | 650 | 24000 | 3.7 | 20 | Yes |
| 10 | 94 | 630 | 78000 | 4.1 | 40 | Yes |
| 11 | 96 | 710 | 16000 | 4.3 | 30 | Yes |
| 12 | 95 | 680 | 68000 | 4.0 | 40 | Yes | amounts of the rare earth elements as reduced to the corresponding oxides thereof+the amount of the excess oxygen as reduced to silicon dioxide) falls outside the range of the present invention, as a result of lowering of sinterability, the relative density is as low as 93–96%, flexural strength is as low as 630–710 MPa, and fracture toughness is as low as 3.7–4.3 MPa/m$^{1/2}$; and tungsten silicide, which is a brittle substance, is generated. Therefore, the sintered materials Nos. 9 through 12 exhibit poor strength. Since the specific resistance is as high as 24,000–78,000 $\mu\Omega\cdot$cm, when the sintered materials Nos. 9 through 12 are used as a heater of, for example, a glow plug, power consumption increases. In addition, since the effective firing temperature range is as narrow as 20–40 degrees, due to non-uniformity of temperature within a firing furnace or changes in furnace temperature over the course of time caused by impairment of consumable parts of the furnace, reliable characteristics are not obtained.

Next, the present invention will be further illustrated by reference to the attached drawing. However, the present invention should not be construed as being limited thereto.

FIG. 1 shows an example of the glow plug according to the present invention in which the construction of an inner portion thereof is illustrated. The glow plug 50 has a ceramic heater 1 and an outer metal cylinder 3 retaining the same, and a main metal member 4 joined to the metal cylinder. The ceramic heater 1 has a shape of a rod, and a resistance heating element 11 is buried in a front end portion 2 thereof. A first heater terminal 12a for supplying a current to the resistance heating element 11 is formed in an exposed state on an outer circumferential surface of a rear end portion of the heating element. The outer metal cylinder 3 is formed tubularly, and holds the ceramic heater 1 on an inner side thereof so that a rear end portion and a front end portion 2 thereof project from the metal cylinder in the axial direction O thereof. The main metal member 4 is formed tubularly so as to be joined coaxially to the outer metal cylinder 3.

The main metal member 4 is provided on an outer circumferential surface thereof with a threaded portion 5 as a fixing portion for securing the glow plug 50 to an engine block (not shown), and a metal shaft 6 is fixed to a rear end portion of the main metal member. The metal shaft 6 is formed in the shape of a rod, and inserted into an inner side of the rear end portion of the main metal member 4 in the axial direction O. The metal shaft 6 is disposed so that a front end surface 6s thereof is opposed in the axial direction O to a rear end surface 2r of the ceramic heater 1. A metal terminal ring 14 electrically connected to the first heater terminal 12a is fixed in a close fitted state on an outer circumferential surface of a rear end portion of the ceramic heater 1 so as to cover the first heater element 12a. The metal shaft 6 and first heater terminal 12a are electrically connected together via a metal lead member 17 joined at one end thereof to the terminal ring 14, and at the other end thereof to the metal shaft 6. Since the metal lead member 17 is fixed to the terminal ring 14 by metal/metal connection, a complicated structure requiring a high manday, such as a metal/ceramic material soldered structure, and a structure in which the metal lead member 17 is connected to the ceramic heater 1 by burying the former in the latter is eliminated. This enables the glow plug to be manufactured at a low cost. Since the terminal ring 14 is fitted on the ceramic heater 1 by close fitting, such a solder layer as is formed by a soldering method in a related art structure is not interposed therebetween, so that a concentricity of the metal shaft 6 and terminal ring 14 is secured easily. Owing to such a structure, the slippage of joint surfaces of the metal lead member 17 and metal shaft 6 or terminal ring 14 becomes hard to occur, and, in its turn, a joint portion of a good quality and a high strength can be formed.

A second heater terminal 12b for supplying a current to the resistance heating element 11 is formed in an exposed state on the portion of the outer circumferential surface of the ceramic heater 1 which is ahead of the first heater terminal 12a in the axial direction O. The tubular metal cylinder 3 covering and electrically connected to the second heater terminal 12b is fixed in a close fitted state on an outer circumferential surface of the ceramic heater 1 with a rear end portion of the ceramic heater 1 projected in the rearward direction thereof. The main metal member 4 is fixed at a cylindrical heater holding surface 4a thereof to the outer circumferential surface of the outer metal cylinder 3.

Owing to this structure, the outer metal cylinder 3 and terminal ring 14 are fixed in a close fitted state on both of the two heater terminals 12a, 12b used to supply a current to the ceramic heater 1. The assembled structure of the glow plug is thereby further simplified.

The second heater terminal 12b is disposed ahead of the first heater terminal 12a in the axial direction O and the outer metal cylinder 3 is used also as a terminal ring with the main metal member 4 fixed to the outer metal cylinder 3. According to this structure, the outer metal cylinder 3 is used also as a terminal ring. This enables the number of parts to be reduced, and the glow plug according to the present invention to be provided at a lower price.

The main metal member 4 is fixed to the outer surface of the outer metal cylinder 3 to be exact. According to this arrangement, the outer metal cylinder 3 interposed between the main metal member 4 and ceramic heater 1 is used as a spacer, so that a suitable width of clearance can be formed between the outer circumferential surface of a rear end portion of the ceramic heater 1 projected rearward from the outer metal cylinder 3 and the portion of the inner circumferential surface of the main metal member 4 which is on the rear side of the heater holding surface 4a thereof. This makes it easier to provide the terminal ring 14 on the rear end portion of the ceramic heater 1.

The ceramic heater 1 is formed as a rod type ceramic heater element in which the resistance heating element 11 is buried in a ceramic base member 13 formed of an insulating ceramic material. In this mode of embodiment, the ceramic heater 1 is formed as a ceramic heater in which a ceramic resistor 10 formed of a conductive ceramic material (i.e., the silicon nitride—tungsten carbide composite sintered material of the invention) is buried in the ceramic base member 13 formed of an insulating ceramic material. The ceramic resistor 10 is formed of a first conductive ceramic material provided in a front end portion of the ceramic heater 1, and has a first resistor portion 11 functioning as a resistance heating element, and a pair of second resistor portions 12, 12 disposed at the rear of the first resistor portion 11 so as to extend in the axial direction O of the ceramic heater 1, joined at front end portions thereof to both end portions in the current supplying direction of the first resistor portion 11, and formed of a second conductive ceramic material a resistivity of which is lower than that of the first conductive ceramic material. The two second resistor portions 12, 12 of the ceramic resistor 10 have branching sections formed at the parts thereof which are in positions of mutually different heights in the axial direction O. The parts of these branching sections which are exposed to the surface of the ceramic heater 1 form the first heater terminal 12a and second heater terminal 12b respectively.

In this mode of embodiment, a silicon nitride ceramic material is employed as an insulating ceramic material constituting the ceramic base member 13. The texture of the silicon nitride ceramic material is formed by combining main phase particles, which contain silicon nitride ($Si_3N_4$) as a main component, with one another by a grain boundary phase derived from a sintering assistant component and the like which will be described later. The main phase may be a phase in which Al or O is substituted for a part of Si or N, or, furthermore, a phase in which atoms of metals, such as Li, Ca, Mg, Y, etc. are solid-dissolved.

The present invention is not limited to the aforementioned Examples and drawing, and various modifications may be made in accordance with purposes and uses.

According to the silicon nitride—tungsten carbide composite sintered material of the present invention, when the total in amounts of an entirety of rare earth elements as reduced to certain corresponding oxides thereof and excess oxygen as reduced to silicon dioxide is regulated to 6–20 mass %, and when the ratio, on a mol basis, of (the amounts of rare earth elements as reduced to the certain corresponding oxides thereof)/(the amounts of the rare earth elements as reduced to the corresponding oxides thereof+the amount of excess oxygen as reduced to silicon dioxide) is regulated to 0.3–0.7, sinterability can be enhanced. As a result, an effective firing temperature range within which reliable characteristics of the resultant sintered material are obtained is widened, and raw materials undergoing the sintering process are not easily affected by a reducing atmosphere, and therefore attain healthy densification, leading to high flexural strength and fracture toughness, low specific resistance, a wide effective firing temperature range, and prevention of generation of tungsten silicide, which is a brittle substance. Thus, a silicon nitride—tungsten carbide composite sintered material exhibiting excellent thermal shock resistance can be produced. The sintered material is suitable for forming a wear-resistant member such as a bearing ball, an engine member such as a tappet shim, and a heater of a glow plug, which generates heat through application of electricity.

This application is based on Japanese Patent Application No. 2000–374549 filed Dec. 8, 2000, the disclosure of which is incorporated herein by reference in its entirety.

What is claimed is:

1. Silicon nitride—tungsten carbide composite sintered material comprising silicon nitride and tungsten carbide, characterized in that:

the total amount of:
the entirety of rare earth element or elements contained in the sintered material, as reduced to certain corresponding oxides thereof; plus
any excess oxygen, as reduced to silicon dioxide, is in the range of from 6 to 20 mass %; and the ratio, on a mol basis, of (the amounts of rare earth elements as reduced to the certain corresponding oxides thereof)/(the amounts of the rare earth elements as reduced to the corresponding oxides thereof+the amount of excess oxygen as reduced to silicon dioxide) is in the range of from 0.3 to 0.7.

2. The silicon nitride—tungsten carbide composite sintered material as claimed in claim 1, wherein the total amount of rare earth elements plus excess oxygen is in the range of from 7 to 15 mass %.

3. The silicon nitride—tungsten carbide composite sintered material as claimed in claim 1, wherein said ratio is in the range of from 0.3 to 0.5.

4. The silicon nitride—tungsten carbide composite sintered material as claimed in claim 1, wherein said rare earth element is one or more selected from the group consisting of Y, Sc, La, Ce, Pr, Nd, Gd, Tb, Dy, Er and Yb.

5. The silicon nitride—tungsten carbide composite sintered material as claimed in claim 1, wherein a crystalline phase is present in an intergrain region of the sintered material.

6. The silicon nitride—tungsten carbide composite sintered material as claimed in claim 5, wherein said crystalline phase comprises at least one of $RE_2Si_2O_7$ and $RE_2SiO_5$ where RE is a rare earth element.

7. The silicon nitride—tungsten carbide composite sintered material as claimed in claim 1, having a flexural strength of at least 800 MPa obtainable by sintering at an effective firing temperature which encompasses a range of at least 100° C.

8. The silicon nitride—tungsten carbide composite sintered material as claimed in claim 7, wherein said effective firing temperature encompasses a range of at least 140° C.

9. A process for preparing a silicon nitride—tungsten carbide composite sintered material as claimed in claim 1, which comprises sintering a mixture of silicon nitride powder, an oxide of a rare earth element and silicon dioxide powder, said composite sintered material having a flexural strength of at least 800 MPa obtainable by sintering at an effective firing temperature which encompasses a range of at least 100° C.

10. The process as claimed in claim 9, wherein said effective firing temperature encompasses a range of at least 140° C.

11. The process as claimed in claim 9, wherein said effective firing temperature encompasses a range of at least 180° C.

12. A glow plug having a ceramic heater comprising the silicon nitride—tungsten carbide composite sintered material as claimed in claim 1.

* * * * *